United States Patent
Wheelock

(10) Patent No.: US 11,985,046 B2
(45) Date of Patent: May 14, 2024

(54) DYNAMIC DATA RECOMBINATION THROUGH DEPLOYABLE MODULES

(71) Applicant: ARRIS Enterprises LLC, Suwanee, GA (US)

(72) Inventor: Ian G. Wheelock, Cork (IE)

(73) Assignee: ARRIS ENTERPRISES LLC, Horsham, PA (US)

(*) Notice: Subject to any disclaimer, the term of this patent is extended or adjusted under 35 U.S.C. 154(b) by 0 days.

(21) Appl. No.: 17/739,428

(22) Filed: May 9, 2022

(65) Prior Publication Data
US 2023/0030925 A1  Feb. 2, 2023

Related U.S. Application Data

(60) Provisional application No. 63/227,535, filed on Jul. 30, 2021.

(51) Int. Cl.
*H04L 41/5009* (2022.01)
*H04L 41/142* (2022.01)
*H04L 43/10* (2022.01)

(52) U.S. Cl.
CPC ........ *H04L 41/5009* (2013.01); *H04L 41/142* (2013.01); *H04L 43/10* (2013.01)

(58) Field of Classification Search
None
See application file for complete search history.

(56) References Cited

U.S. PATENT DOCUMENTS

| 2013/0208880 A1 | 8/2013 | Lovy et al. |
| 2015/0019486 A1* | 1/2015 | Gaikwad ................. G06F 16/27 707/625 |

(Continued)

FOREIGN PATENT DOCUMENTS

| EP | 0 529 787 | 3/1993 |
| EP | 1 981 210 | 10/2008 |

OTHER PUBLICATIONS

International Search Report and the Written Opinion of the International Searching Authority dated Jul. 26, 2022 in International (PCT) Application No. PCT/US2022/028279.

*Primary Examiner* — Kevin T Bates
*Assistant Examiner* — Dae Kim
(74) *Attorney, Agent, or Firm* — Wenderoth, Lind & Ponack, L.L.P.

(57) ABSTRACT

A system and method that enable data processing and dynamic recombination of data by software on a device to be enhanced without requiring a replacement of the main software image on the device. Runtime management objects are generated at a network management platform including an interpreted application. The runtime management objects, KPIs, and interpreted application are downloaded network access devices. Data is collected at the interpreted application and analytics is performed on the collected data. First new runtime management objects are dynamically created at the interpreted application. The first new runtime management objects are presented to the network management platform. Analytics on the first new runtime management objects is performed at the network management platform to generate second new runtime management objects to provide to the plurality of network access devices for processing by the downloaded interpreted applications.

20 Claims, 6 Drawing Sheets

(56) References Cited

U.S. PATENT DOCUMENTS

| | | | |
|---|---|---|---|
| 2017/0006135 A1* | 1/2017 | Siebel | G06Q 10/06 |
| 2018/0351806 A1 | 12/2018 | Mohanram et al. | |
| 2020/0065208 A1* | 2/2020 | Vijendra | G06F 11/3447 |
| 2021/0194774 A1* | 6/2021 | Yang | H04L 41/142 |

* cited by examiner

DYNAMIC DATA RECOMBINATION THROUGH DEPLOYABLE MODULES

BACKGROUND

The subject matter of the present disclosure relates generally to a system and method to enable data processing and dynamic recombination of data by software on a device to be enhanced without requiring a replacement of the main software image on the device.

Current network management requires constantly polling data from gateways by a centralized, remote management platform. The remote management platform conducts analytics, generates KPIs, etc. based on data objects compiled into the gateways. Current gateway models work with a fixed set of data objects for remote management purposes. The data objects may only be modified through a new software load. Thus, if a device is requested to change how it processes data that is different to how its currently running software was developed, this software must be updated and replaced on the device. In the case of embedded systems, where software updates may take a very long time to be developed, tested, and finally deployed, this presents a problem if such processing changes are urgently required. Further, network management could benefit from updated analytics and modified data objects by taking advantage of dynamically modified local processing in the gateway.

For example, network management data is based around a pre-existing data model or some vendor extensions to the data model. Remote or local network monitors depend on access to the data, typically collected on a periodic basis to develop an overall network health view of a device, or collection of devices. The various network monitoring options rely on this collected data being transformed into various statistical views of data. To reduce network load, computation and storage, a lot of monitoring operates on a 15-minute collection interval that in some cases provides an "average" view of a network. Such a view can miss details.

As network monitoring evolves, if any additional data required to support various statistics is not available from the monitored devices, an enhancement request to add support is filed, which if accepted begins a potentially lengthy process before the data is made available in a future software release for the device. If the device is supplied by multiple vendors, then this further complicates when such new data will eventually be available across all such devices.

Most data models are developed by committee, with a view to trading off complexity, obscurity and detail with a broadly acceptable solution. As a result, anything not in the standard model may not be available, or is encoded in proprietary data objects. In a lot of cases data models only offer basic data, avoiding any statistical summarization of data—leaving such processing to remote network management systems.

Such a system can poll data, apply processing steps to data and eventually store the data and results. If a polling rate has to increase, it leads to an increase in network demand, CPU demand and storage demand all of which increase the cost of a solution.

SUMMARY

An aspect of the present disclosure involves a system and method to enable data processing and dynamic recombination of data by software on a device to be enhanced to extend an existing data model and/or repurposing some placeholder objects in the existing data model to store results without requiring a replacement of the main software image on the device.

A network management platform generates runtime management objects for an existing data model, defines key performance indicators (KPIs), and defines an interpreted application. The runtime management objects, the KPIs, and the interpreted application are downloaded to a plurality of network access devices. The plurality of network access devices receive the KPIs and the runtime management objects from the network management platform. The interpreted application, downloaded to the plurality of network access devices, collects data associated with the KPIs in real-time. The interpreted application, downloaded to the plurality of network access devices, performs analytics on the collected data. First new runtime management objects are dynamically created, at the interpreted application downloaded to the plurality of network access devices, without having to reboot based on analytics performed on the collected data. The interpreted application downloaded to the plurality of network access devices presents the first new runtime management objects to the network management platform.

The runtime management objects are accessed and the data are collected via a system bus.

The network management platform periodically polls the plurality of network access devices to access the first new runtime management objects created in real-time by the interpreted application downloaded to the plurality of network access devices.

New statistics and new KPI data created by the interpreted application downloaded to the plurality of network access devices are accessed.

The network management platform performs analytics on the first new runtime management objects received from the plurality of network access devices to generate second new runtime management objects to provide to the plurality of network access devices for processing by the interpreted application downloaded to the plurality of network access devices, wherein the second new runtime management object extend the existing data model.

Analytics performed by the network management platform are offloaded to the plurality of network access devices in distributive manner by downloading the first new runtime management objects, the KPIs, and the interpreted application downloaded to the plurality of network access devices.

The interpreted application downloaded to the plurality of network access devices collects data associated with the KPIs in real-time by storing the collected data in local object storage at the plurality of network access devices.

The interpreted application downloaded to the plurality of network access devices presents the first new runtime management objects to the network management platform by storing output of the analytics in local object storage accessible by the network management platform.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to enable data processing and dynamic recombination of data by software on a device to be enhanced to extend an existing data model and/or repurposing some placeholder objects in the existing data model to store results without requiring a replacement of the main software image on the device. A subsystem is integrated within the main software image that can be operated independent of the main software system. This subsystem relies on having read and write access to portions of existing data and some existing services within the main software system. The subsystem is capable of being restarted on demand, and also supports the installation of programs or scripts that allow for the dynamic recombination of data.

Figure 1:
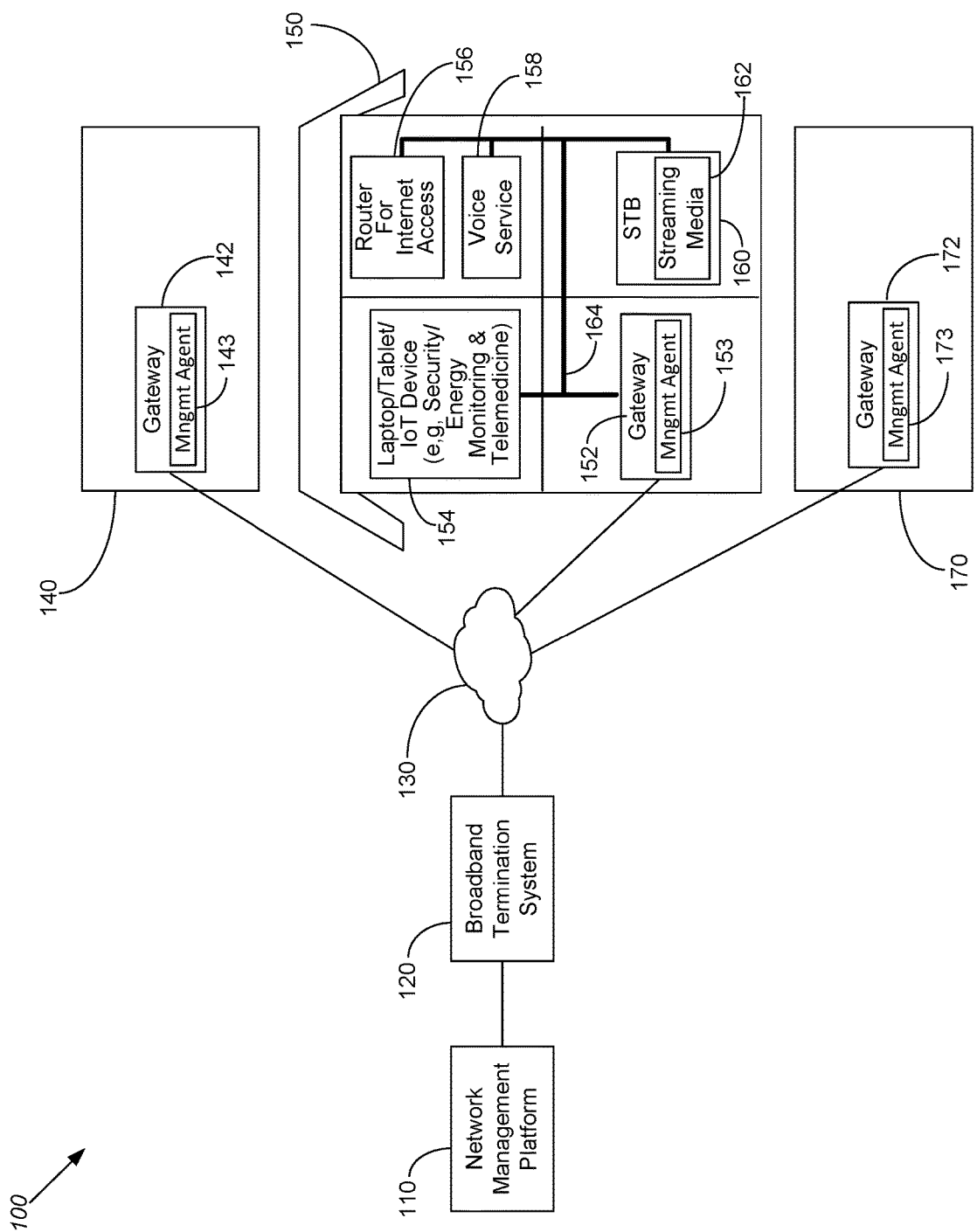
FIG. 1 illustrates a system for providing dynamic data recombination through deployable modules.

FIG. 1 illustrates a system 100 for providing dynamic data recombination through deployable modules.

FIG. 1 shows a network management platform 110 and a plurality of distributed gateways 142, 152, 172 placed in locations 140, 150, 170, respectively. Network management platform 110 communicates with the plurality of distributed gateways 142, 152, 172 through a broadband termination system 120 and network 130.

In location 150, gateway 152 is coupled to other devices via network connection 164. A laptop/tablet/Internet-of-Things (IoT) device 154 is coupled to gateway 152 by network connection 164. the to provide services, such as security/energy monitoring and telemedicine. Router 156 is coupled to gateway 152 by network connection 164 to provide Internet access. Voice services 158, such as Voice over IP (VoIP) devices, web phones including cellphones and computer devices, etc., is connected to gateway 152 by network connection 164. Set-Top Box 160 is also coupled to gateway 152 by network connection 164 to support streaming media 162 and other functions, such as presentation of an electronic program guide, audio, internet web pages, interactive video games, etc.

Management agents 143, 153, 173 manage all of the local interaction within a device, such as gateways 142, 152, 172, and support communication with remote network management platform 110. The gateways 142, 152, 172 perform local data query collection, data analysis and processing, and creation/mapping of new data. The network management platform 110 dynamically generates the runtime management objects, define key performance indicators (KPIs), define an interpreted application that is downloaded to gateways 142, 152, 172. The generated runtime management objects fit into the existing network management model already on the gateways 142, 152, 172. The network management platform 110 periodically polls the gateways 142, 152, 172 to access new runtime management objects created by the gateways 142, 152, 172 in real-time. The network management platform 110 then performs analytics on the new runtime management objects received from the plurality of network access devices to generate additional, new runtime management objects to provide to the gateways 142, 152, 172 for processing. This process may be repeated in an iterative manner to continuously improve management of the gateways 142, 152, 172 by the remote network management platform 110. The new runtime management objects may be used to extend the existing network management model and/or to repurpose some placeholder objects to store data without needing to create an entirely new network management model. Thus, data processing and dynamic recombination of data is performed by software on gateways 142, 152, 172 so that such data is enhanced without requiring a replacement of the main software image on the device.

Figure 2:
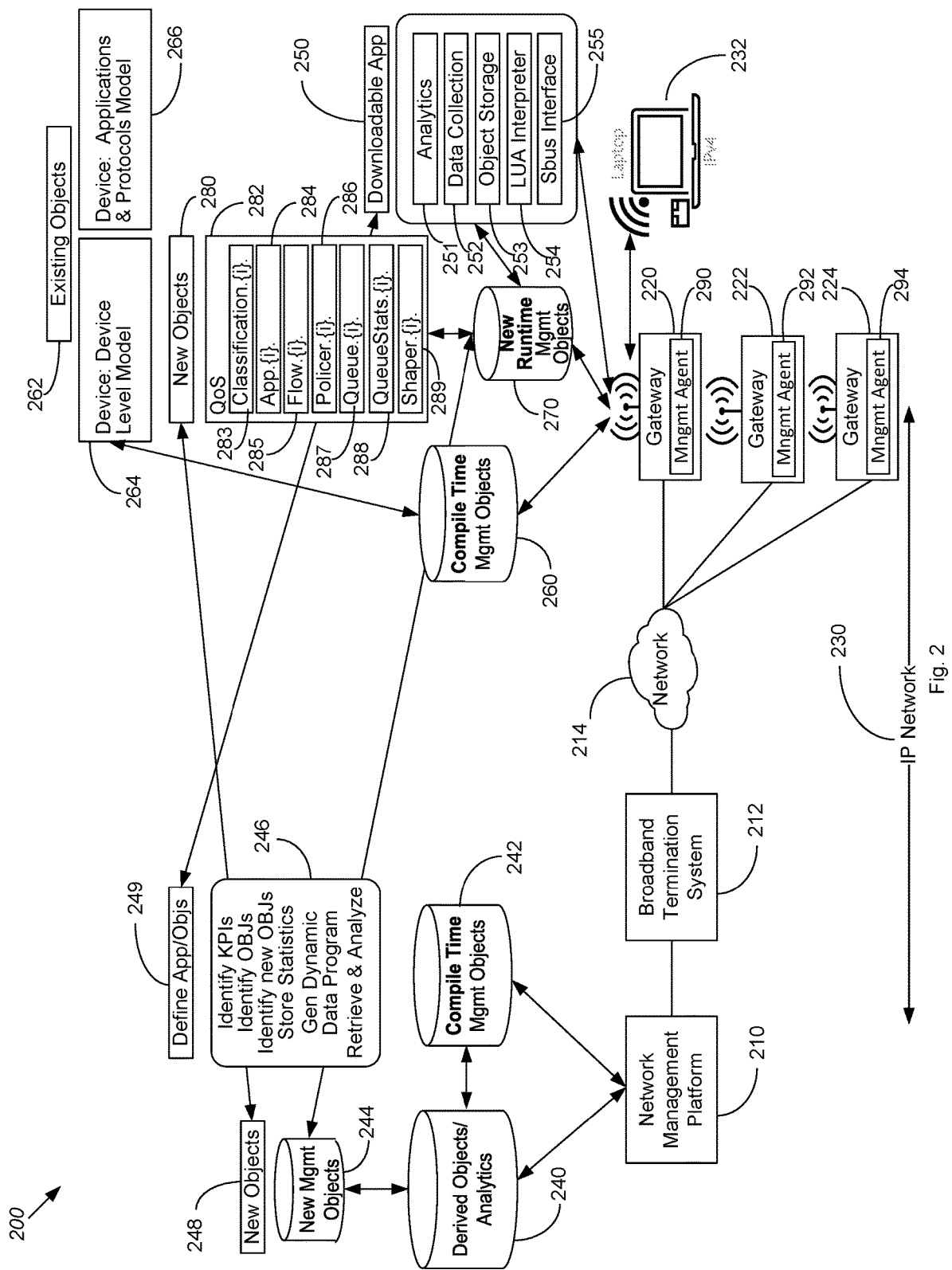
FIG. 2 illustrates a system that enables data processing and dynamic recombination of data by software on a device to be enhanced without requiring a replacement of the main software image on the device.

FIG. 2 illustrates a system 200 that enables data processing and dynamic recombination of data by software on a device to be enhanced without requiring a replacement of the main software image on the device.

FIG. 2 shows a network management platform 210 that communicates through a network 214 with distributed gateways 220, 222, 224 through a broadband termination system 212. Gateways 220 is shown provide access to services to laptop 232. An IP network 230 connects network management platform 210 through broadband termination system 212, network 214 to gateways 220, 222, 224. Network management platform 210 uses standard management objects of data models, such as those defined by groups like the Broadband Forum. Compile time management objects 242, 260 are provided in the network management platform 210 and the gateways 220, 222, 224 for a specific deployed version of software. The compile time management objects 242, 260 are fixed and do not change unless a new version is produced for the network management platform 210 and the gateways 220, 222, 224. Existing objects 262 are described according to existing data models, such as Device Level Model 264 and Device Applications & Protocols Model 266. Other data models may be used. The existing objects 262 fit into the existing data model.

Data models, such as Device Level Model 264 and Device Applications & Protocols Model 266 contain objects and parameters that describe the many different functions and capabilities available to devices and services that are manageable via a predetermined protocol, such as CPE WAN Management Protocol (CWMP). The network management platform 210 conducts analytics to derive data object 240. The network management platform 210 perform operations 246 to identify KPIs, identify objects, identify new objects. The network management platform 210 perform operations 246 to define new data objects 248 and new management objects 244. As part of the operations 246, the network management platform 210 generates a dynamic data program. The defined objects and the dynamic data program 249 are provided to the gateways 220, 222, 224. The dynamic data program 249 is provided to the gateways 220, 222, 224 as downloadable app 250. The new management objects 244 are downloaded as a runtime program, i.e., new runtime management objects 270 that are downloaded to the running gateways 220, 222, 224. The new management objects 244 may be used to extend the existing data model and/or repurpose some placeholder objects in the existing data model to store results without needing to create an entirely new model.

A new data object 280 may, for example, be a Quality of Service (QoS) object 280, which is a queue management configuration object. The QoS object 282 includes various tables for setting parameters for setting and controlling a QoS. A classification table 283 within the QoS object 282 specifies the assignment of each packet arriving at an ingress interface to a specific internal class. The App table 284 and the Flow table 285 are used to specify the classification outcome associated with each such flow. The App table 284 contain entries, wherein each entry is associated with an application-specific protocol handler. For each entry in the App table 284 there can be one or more associated entries for the Flow table 285. Each entry in the Flow table 285 identifies a type of flow associated with the protocol handler. The Policer table 286 defines the policing parameters for ingress packets identified by either an entry in the Classification table 283 (or the default classification) or a dynamic flow identified by a protocol handler identified in the App table 284. Each Policer table 286 entry specifies the packet handling characteristics, including the rate requirements and behavior when these requirements are exceeded. The Queue table 287 specifies the number and types of queues, queue parameters, shaping behavior, and scheduling algorithm to use. Each entry in the Queue table 287 specifies the traffic classes with which it is associated, and a set of egress interfaces for which a queue with the corresponding characteristics needs to exist. The QueueStats table 288 provides the statistics for each queue. The Shaper table 289 is used to shape a packet stream to fit in a traffic profile. Packets may also be dropped. In case of a single queue for that interface, the shaper determines the egress rate of the queue. In case of multiple queues for that interface (possibly with per queue shaping rates), the shaper table determines the aggregate egress rate on that interface.

Thus, gateways 220, 222, 224 have compile time management objects 260 and a downloadable app 250 that is received from the network management platform 210. The 220, 222, 224 may also have new runtime management objects that are received from the network management platform 210. The gateways 220, 222, 224 execute the downloadable app 250 to create newer runtime management objects 270. Downloadable application 250 is running and interacting with systems in gateway 220 through a system bus (Sbus) interface 255 to query information and collect data 252. Downloadable application 250 is created through the use of an "interpreted" language (such as LUA) that basically relies on a language file (or script) to be supplied, and an interpreter, e.g., LUA interpreter 254, as an example, actually runs the program by performing a realtime conversion of the script into computer instructions on gateway 220.

Downloadable application 250 interacts with local network management data and provides ways and means of dynamically collecting and transforming such data to provide either new insights into collected data (possibly collected at far higher frequencies than the remote network management platform 210 could support), or add new management objects that relate to existing data that is exposed as new objects to the external network management platform 210, or to support interesting applications of packet interception and inspection that would not normally be available.

An existing set of data models are part of a compiled image. The downloadable application actively extends the data models that are in the compiled image. Thus, the creation of objects and/or data may be completely disconnected from the main set of management objects.

Downloadable application 250 performs analytics 251 on this data, resulting in new perspectives/metrics being dynamically created. The results of the analytics may be stored in object storage 253. Thus, the new runtime management objects 270 can be instantiated, and used by the downloadable app 250 to collect new and novel information that was not previously collected and that were included within the existing compiled management objects 260. Thus, new runtime management objects 270 produced by the network management platform 210 or the downloadable app 250 did not exist before within the software stack, but now exist for use by the downloadable app 250 and the remote network management platform 210.

Gateway 220 uses the newer runtime management objects to collect further new and novel information that was not previously collected. When gateway 220 has that information, the setup allows the device tree that contains all of the existing management objects to be extended with newer management objects 244. Gateway 220 does not modify the existing objects, but instead creates newer management objects 244 that are accessed by the remote network management platform 210.

Once the remote network management platform 210 retrieves this information as new management objects 244, the network management platform 210 manipulates the new management objects 244, generates the KPIs, and stores statistics 246. The network management platform 210 may define even newer runtime management objects 270 that may be presented to the gateways 220, 222, 224. These new runtime management objects 270 are objects that are effectively created by the downloadable application 250.

Gateways 220, 222, 224 include management agents 290, 292, 294. Management agents 290, 292, 294 may be SNMP agents, TR-069 agents, User Services Platform (USP) agents, etc. The management agents 290, 292, 294 within gateways 220, 222, 224 use a predetermined protocol, such as CWMP, to communicate with the network management platform 210. Management agents 290, 292, 294 manages all of the local interaction within a device, such as gateways 220, 222, 224, including handling all management objects, e.g., compile time management objects 260 and new runtime management objects 270, and supports communication with a remote network management platform 210.

When the network management platform 210 requests an object, network management platform 210 uses this protocol to communicate with the gateways 220, 222, 224. the gateways 220, 222, 224 then look where this information is located, e.g., in the existing compile time management objects 260 that were available at compile time or from new runtime management objects 270 that are only available through the downloadable application 250. The downloadable application 250 works within the context of the agent to obtain data from the compile time management objects 260, the new runtime management objects 270, or by accessing local information availed to the downloadable application 250 through the system bus 255 or other available application programming interfaces (APIs) that may not already be exposed via the compile time objects 260.

By offloading the analytics 251 and data collecting 252 to the downloadable app 250 in the gateways 220, 222, 224, new types of data can be added dynamically without the network management platform 210 having to poll more frequently and without increasing the total traffic exchanged between the network management platform 210 and the gateways 220, 222, 224. The downloadable application 250 performs local data query collection, data analysis and processing, and creation/mapping of new data that provides far greater insight into data due to access to realtime time data. The network management platform 210 dynamically generates the extra required management objects and provides the processing required to create new values/analytics that the network management platform 210 can retrieve on the standard 15-minute poll. The downloadable applications 250 interacts with either the local higher layer data model, e.g. TR-181, as well as some existing lower layer interfaces, takes this information, stores it locally, and performs various transformations on this data, such as statistical analysis, compression, filtering, etc., to create new data of value to the network management platform 210.

Thus, the gateways 220, 222, 224 and the network management platform 210 work together through the downloadable application 240 that instantiates new management objects. During runtime, the components of downloadable application 250, such as the analytics 251, data collection 252, object storage 253, LUA interpreter 254, and Sbus interface 255, work together to define new runtime management objects 270. The components of downloadable application 250 create new values, operate new KPIs, perform new collections, and present new objects that the network management platform 210 is able to retrieve. The downloadable app 250 enables the network management platform 210 to take advantage of the newly transformed data. The downloadable app 250 may be dynamically configured to store this data in a set of pre-existing "extensions" within the main data model. KPIs may be dynamically adapted using an iterative process, where initially a broad list of new objects or statistical functions to perform on data may be provided. Subsequently, the list of objects or statistical functions may be adjusted for more specific purposes. Any shortfalls or redundancy that might be apparent in collected information associated with the newly created runtime objects may thus be constantly adapted.

As an example, the downloadable application 250 may be used to calculate the "5-number summary" of a network interface observed bitrate based on a 30-second sample rate. This "5-number summary" would be published to a specifically nominated set of extension objects 262 with the extended data model, e.g., Device Level Model 264 and Device Application & Protocol Model 266, once every 15 minutes for the regular collection interval of network management platform 210. This particular set of statistics are not available from the regular model, so by using the downloadable application 250 is dynamically recombining existing data into new data, which reduces the network load, the remote CPU load and the storage load.

Prior network management platforms would need to poll the device 30 times (15 minutes/30 seconds) and due to the management protocol overhead, consume CPU on both the cloud and the network management platform side to prepare the management request, deliver it to the network management platform, have the network management platform decode the data, retrieve the data, encode the response, followed by more CPU and storage requirements to store the 30 values, along with keys and timestamps into a data store. Subsequently after 30 samples are collected, the network management platform would need to perform the statistical 5 number summary, and store the results into the data store again.

By offloading the processing to the downloadable application 250, the 30-second collection interval performed in from the network management platform 210 would not require from the network management platform 210 any additional network traffic, or remote CPU or storage, and would fit within the normal operating process. The downloadable platform would perform the 5-number summary calculation, and provide these to the network management platform 210 to be stored in some previously notified extension objects within the specific data model. The only extra load on the network management platform 210 would be to collect the new extension objects and store them in its data store until such data was used in a report or dashboard view.

This example shows the benefit of a network management platform 210 and gateways 220, 222, 224 collaborating using this approach. When 100's or 1,000's of gateways 220, 222, 224 are considered, the benefits become more considerable. Taking the same example, and using a population of 100,000 gateways, the 30-second polling, computation and storage approach requires that a prior network management platform to issue a network management request every 300 ns, and store (if using 64 bit bitrate values, a 64 bit timestamp, and potentially a unique database key of possibly 128 bits) 100,000*32 bytes every 30 seconds=(3.2 Mbytes) which translates into 9.26 Gb/day=64 Gb/week. This would also require the 15 minute 5-number summary to be stored, which if based on 64-bit values for each of the 5 numbers (plus a 64-bit timestamp and 128-bit database key) would require 100,000*64 bytes every 15 minutes/day=614 Mb of data (4.298 Gb/week).

Using the network management platform 210 in collaboration with the downloadable application 250, roughly 60 Gb of data/week would be saved by avoiding the 30-second polling interval (and associated processing). Moving to a 5-second polling would multiply these requirements by a factor of six. Such a downloadable application 250 could perform an entire suite of data processing steps to provide enhanced visibility into the operation of gateway 220 without overwhelming the remote management platform 210.

In addition to basic data recombination/transformation, the network management platform 210 has the potential to interact with functional blocks of the local downloadable application 250 to provide a microservices capability, including the ability to create basic simple functions for local interaction or even remote interaction (depending on the elements in use). An example of this would include the option for the downloadable application 250 to listen for network traffic (including the use of a network filter), and to forward actual listened-to data, or a transformation of that data to the network management platform 210 over MQTT using a specific topic. The overall options of the system are pretty limitless, and enables more innovation at a faster pace, compared to the usual requirements, specification, design, develop, test and deploy cycle.

Figure 3:
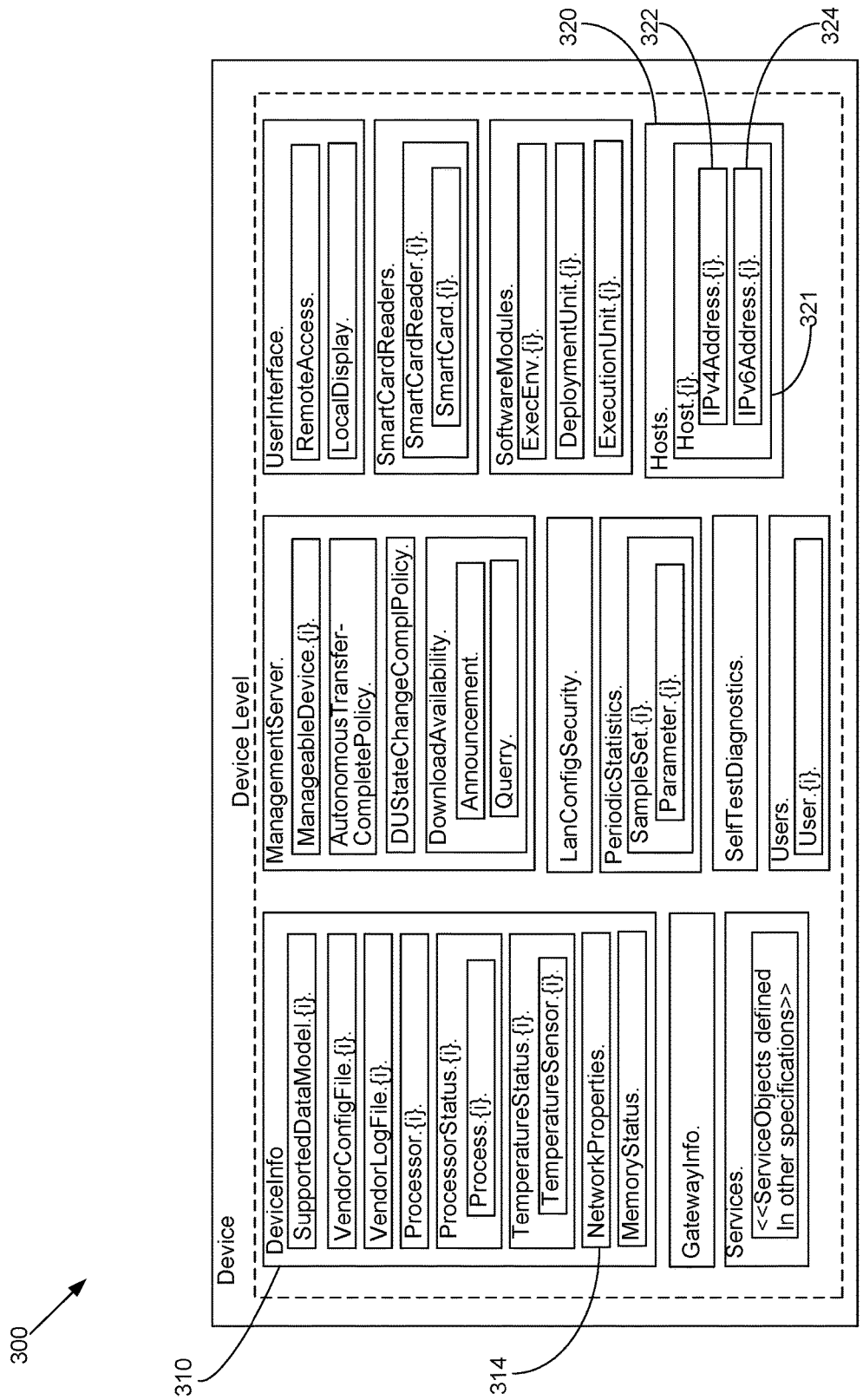
FIG. 3 illustrates an example of a Device Level Model.

FIG. 3 illustrates an example of a Device Level Model 300.

FIG. 3 shows device information object 310 that contains general device information, including network properties object 314. The network properties object 314 defines the parameters that describe how a device handles network traffic. A host object 320 provides information about each of the hosts on the LAN, including those whose IP address was allocated by the CPE using DHCP as well as hosts with statically allocated IP addresses. It can also include non-IP hosts. The host table 321 includes an IPv4Address table 322 that identifies the host's known IPv4 addresses. The host table 321 also includes an IPv6Address table 324 that identifies the host's known IPv6 addresses.

Figure 4:
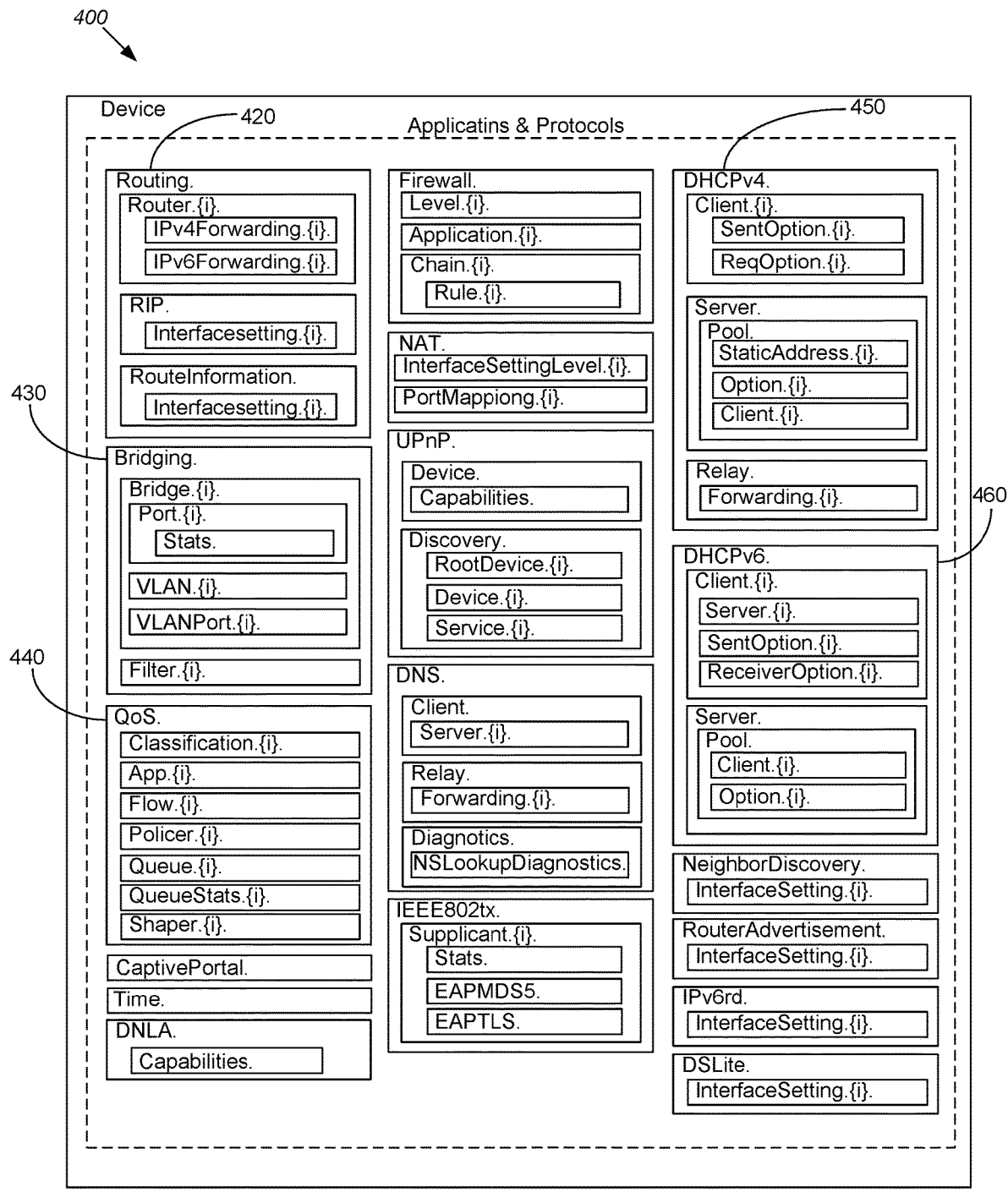
FIG. 4 illustrates an example of a Device Applications & Protocols Model.

FIG. 4 illustrates an example of a Device Applications & Protocols Model 400.

FIG. 4 shows Device Applications & Protocols Model 400 including a routing object 420 that contains the router table and RIP protocol object. The Device Applications & Protocols Model 400 includes a bridging object 430 that identifies the Layer 2 bridging configuration. The bridging object 430 specifies bridges between different layer 2 interfaces. The Device Applications & Protocols Model 400 includes a QoS object 440, as discussed in FIG. 2. The Device Applications & Protocols Model 400 includes a DHCPv4 object 450, which is the Dynamic Host Configuration Protocol (DHCP) IPv4 object and contains the IPv4 Client, Server, and Relay objects. The Device Applications & Protocols Model 400 includes a DHCPv6 object 460, which is the Dynamic Host Configuration Protocol (DHCP) IPv6 object, which contains the IPv6 Client and Server objects.

Figure 5:
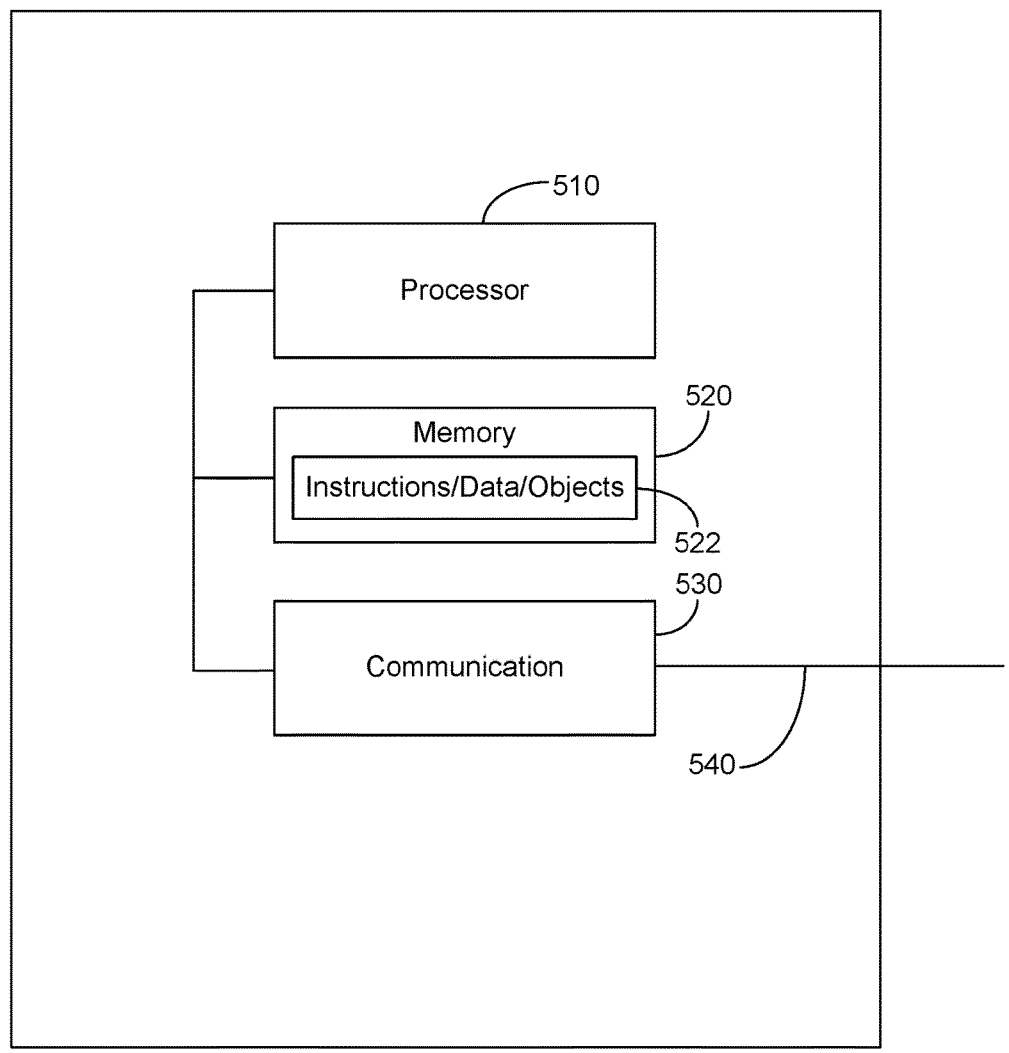
FIG. 5 a block diagram of a network access device.

FIG. 5 a block diagram of a network access device 500.

The network device 500 may be a network management platform, or a gateway or other network access device. The network device 500 includes a processor 510, memory 520, communication device 530, and communication interface 540. Memory 520 may include instructions, data objects, etc. 522. Communication device 530 processes data and packets for transmission. Communication interface 540 implements a protocol for the transmission of the data and packets.

In a network management platform, processor 510 may be configured using the instructions in memory 520 to generate runtime management objects, define key performance indicators (KPIs), define an interpreted application, download the runtime management objects, the KPIs, and the interpreted application to a plurality of network access devices, periodically poll the plurality of network access devices to access from the plurality of network access devices first new runtime management objects created in real-time by the interpreted application downloaded to the plurality of network access devices, and perform analytics on the first new runtime management objects received from the plurality of network access devices to generate second new runtime management objects to provide to the plurality of network access devices for processing by the interpreted application downloaded to the plurality of network access devices. The processor 510 periodically polls the plurality of network access devices, such as gateways, to access the first new runtime management objects by accessing storage objects of the plurality of network access devices. The processor 510 may also periodically poll the plurality of network access devices to access new statistics and new KPI data created by the interpreted application downloaded to the plurality of network access devices.

The processor 510 may use new KPI data and runtime management objects to create the analytics used to generate second new runtime management objects. The processor 510 may also store the new KPI data, and the second new runtime management objects for downloading. Analytics on the first new runtime management objects may be performed by the processor 510 to generate new reports and new statistical management information. The runtime management objects, the KPIs, and the interpreted application downloaded to the plurality of network access devices offloads analytics performed by the processor to the plurality of network access devices in a distributive manner.

In a network access device 500, such as a gateway, processor 510 is configured to execute a program interpreters, and download an interpreted application for execution by the interpreter. The processor 510 executes the interpreted application to receive key performance indicators (KPIs) and runtime management objects from a network management platform, access the runtime management objects, collect data associated with the KPIs in real-time via a system bus, perform analytics on the collected data, dynamically create new runtime management objects without having to reboot based on the analytics performed on the collected data, and present the new runtime management objects to network management platform. The network access device 500 includes system bus, wherein the interpreted application uses the system bus to access the runtime management objects and to collect the data. The interpreted application uses the new runtime management objects to produce new KPI data without having to reboot. The interpreted application also stores the collected data in local object storage. Analytics on the collected data stored at local object storage is performed by the interpreted application, and an output of the analytics is stored in the local object storage.

Figure 6:
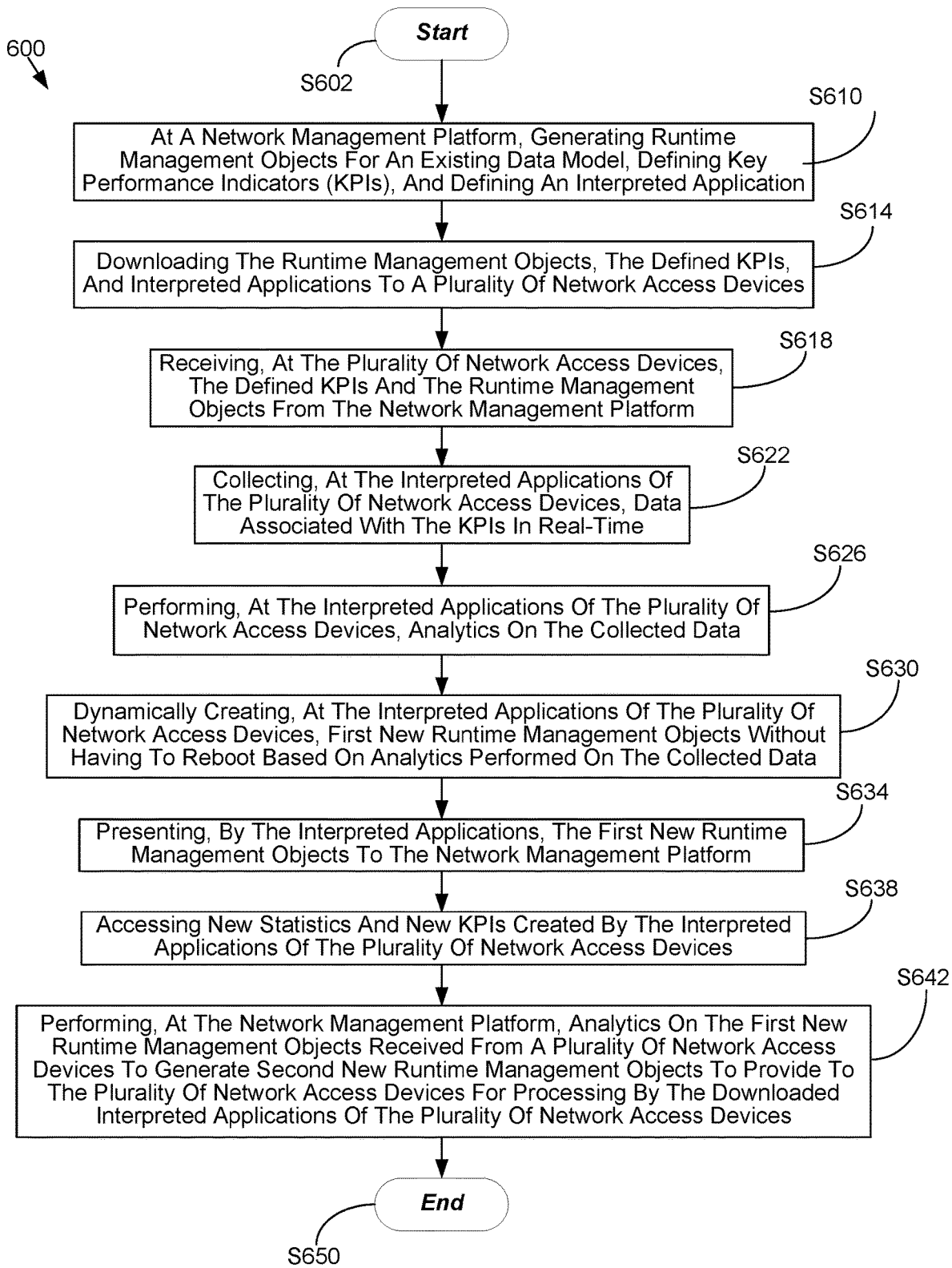
FIG. 6 is a flow chart of a method for enabling data processing and dynamic recombination of data by software on a device to be enhanced without requiring a replacement of the main software image on the device.

FIG. 6 is a flow chart of a method 600 for enabling data processing and dynamic recombination of data by software on a device to be enhanced without requiring a replacement of the main software image on the device.

In FIG. 6, method 500 starts (S602), and runtime management objects are generated at a network management platform that defines key performance indicators (KPIs), and defines an interpreted application (S610). Referring to FIG. 1, management agents 143, 153, 173 manage all of the local interaction within a device, such as gateways 142, 152, 172, and support communication with remote network management platform 110. The gateways 142, 152, 172 perform local data query collection, data analysis and processing, and creation/mapping of new data.

The runtime management objects, the KPIs, and the interpreted application are downloaded to a plurality of network access devices (S614). The KPIs and the runtime management objects are received by the plurality of network access devices from the network management platform (S618). Referring to FIG. 1, the network management platform 110 dynamically generates the runtime management objects, define key performance indicators (KPIs), define an interpreted application that is downloaded to gateways 142, 152, 172.

Data associated with the KPIs are collected at the interpreted application in real-time (S622). Referring to FIG. 2, downloadable application 250 is running and interacting with systems in gateway 220 through a system bus (Sbus) interface 255 to query information and collect data 252.

Analytics is performed on the collected data at the interpreted application (S626). Referring to FIG. 2, downloadable application 250 performs analytics 251 on this data, resulting in new perspectives/metrics being dynamically created.

First new runtime management objects are dynamically created at the interpreted application without having to reboot based on analytics performed on the collected data (S630). Referring to FIG. 2, downloadable application 250 performs analytics 251 on this data, resulting in new perspectives/metrics being dynamically created. The results of the analytics may be stored in object storage 253. Thus, the new runtime management objects 270 can be instantiated, and used by the downloadable app 250 to collect new and novel information that was not previously collected.

The first new runtime management objects are presented by the interpreted application to the network management platform (S634). Referring to FIG. 2, gateway 220 uses the newer runtime management objects to collect further new and novel information that was not previously collected. When gateway 220 has that information, the setup allows the device tree that contains all of the existing management objects to be extended with newer management objects 244. Gateway 220 does not modify the existing objects, but instead creates newer management objects 244 that are accessed by the remote network management platform 210.

New statistics and new KPIs created by the interpreted application are accessed (S638). Referring to FIG. 5, the processor 510 may also periodically poll the plurality of network access devices to access new statistics and new KPI data created by the interpreted application downloaded to the plurality of network access devices.

Analytics on the first new runtime management objects received from a plurality of network access devices is performed at the network management platform to generate second new runtime management objects to provide to the plurality of network access devices for processing by the downloaded interpreted applications (S642). Referring to FIG. 1, the network management platform 110 periodically polls the gateways 142, 152, 172 to access new runtime management objects created by the gateways 142, 152, 172 in real-time. The network management platform 110 then performs analytics on the new runtime management objects received from the plurality of network access devices. The method then ends (S650).

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network management platform, comprising:
    a memory storing computer-readable instructions; and
    a processor, disposed within an enclosure, configured to execute the computer-readable instructions to:
        generate runtime management objects for an existing data model;
        define key performance indicators (KPIs);
        define an interpreted application;
        download the runtime management objects, the KPIs, and the interpreted application to a plurality of network access devices;
        periodically poll the plurality of network access devices to access, from the plurality of network access devices, first new runtime management objects created in real-time by the interpreted application downloaded to the plurality of network access devices; and
        perform analytics on the first new runtime management objects received from the plurality of network access devices to generate second new runtime management objects to provide to the plurality of network access devices for processing by the interpreted application downloaded to the plurality of network access devices, wherein the runtime management objects, the KPIs, and the interpreted application downloaded to the plurality of network access devices, offloads analytics performed by the processor to the plurality of network access devices in a distributive manner.

2. The network management platform of claim 1, wherein the processor periodically polls the plurality of network access devices to access the first new runtime management objects by accessing storage objects of the plurality of network access devices.

3. The network management platform of claim 1, wherein the processor periodically polls the plurality of network access devices to access new statistics and new KPI data created by the interpreted application downloaded to the plurality of network access devices.

4. The network management platform of claim 3, wherein the processor further uses the new KPI data and runtime management objects to create the analytics used to generate the second new runtime management objects, wherein the second new runtime management object extend the existing data model.

5. The network management platform of claim 4, wherein the processor stores the new KPI data, and the second new runtime management objects for downloading.

6. The network management platform of claim 1, wherein the processor further performs analytics on the first new runtime management objects to generate new reports and new statistical management information.

7. The network management platform of claim 1, wherein the network management platform communicates with the plurality of network access devices through a broadband termination system and a network.

8. A network access device, comprising:
a memory storing computer-readable instructions; and
a processor, disposed within an enclosure, configured to execute the computer-readable instructions to:
  execute a program interpreters;
  download an interpreted application for execution by the interpreter, wherein the interpreted application is further configured to:
    receive key performance indicators (KPIs) and runtime management objects for an existing data model from a network management platform;
    access the runtime management objects;
    collect data associated with the KPIs in real-time via a system bus;
    perform analytics on the collected data;
    dynamically create new runtime management objects without having to reboot based on the analytics performed on the collected data; and
    present the new runtime management objects to network management platform, wherein the runtime management objects, the KPIs, and the interpreted application downloaded to the network access device, offloads performing analytics to the network access device and a plurality of network access devices in a distributive manner.

9. The network access device of claim 8 further comprising a system bus, wherein the interpreted application uses the system bus to access the runtime management objects and to collect the data.

10. The network access device of claim 8, wherein the interpreted application uses the new runtime management objects to produce new KPI data without having to reboot, wherein the second new runtime management object extend the existing data model.

11. The network access device of claim 8, wherein the interpreted application stores the collected data in local object storage.

12. The network access device of claim 8, wherein the interpreted application performs the analytics on the collected data stored at local object storage, and stores an output of the analytics in the local object storage.

13. A method for managing a network, comprising:
at a network management platform, generating runtime management objects, defining key performance indicators (KPIs), and defining an interpreted application;
downloading the runtime management objects for an existing data model, the KPIs, and the interpreted application to a plurality of network access devices;
receiving, at the plurality of network access devices, the KPIs and the runtime management objects from the network management platform;
collecting, at the interpreted application downloaded to the plurality of network access devices, data associated with the KPIs in real-time;
performing, at the interpreted application downloaded to the plurality of network access devices, analytics on the collected data;
dynamically creating, at the interpreted application downloaded to the plurality of network access devices, first new runtime management objects without having to reboot based on analytics performed on the collected data; and
presenting, by the interpreted application downloaded to the plurality of network access devices, the first new runtime management objects to the network management platform wherein the downloading the first new runtime management objects, the KPIs, and the interpreted application downloaded to the plurality of network access devices, offloads analytics performed by the network management platform to the plurality of network access devices in a distributive manner.

14. The method of claim 13 further comprising accessing the runtime management objects and collecting the data via a system bus.

15. The method of claim 13 further comprising periodically polling, by the network management platform, the plurality of network access devices to access the first new runtime management objects created in real-time by the interpreted application downloaded to the plurality of network access devices.

16. The method of claim 13 further comprising accessing new statistics and new KPI data created by the interpreted application downloaded to the plurality of network access devices.

17. The method of claim 13 further comprising performing, at the network management platform, analytics on the first new runtime management objects received from the plurality of network access devices to generate second new runtime management objects to provide to the plurality of network access devices for processing by the interpreted application downloaded to the plurality of network access devices, wherein the second new runtime management object extend the existing data model.

18. The method of claim 13, wherein the network management platform communicates with the plurality of network access devices through a broadband termination system and a network.

19. The method of claim 13, wherein the collecting, at the interpreted application downloaded to the plurality of network access devices, data associated with the KPIs in real-time further comprises storing the collected data in local object storage at the plurality of network access devices.

20. The method of claim 13, wherein the presenting, by the interpreted application downloaded to the plurality of network access devices, the first new runtime management objects to the network management platform further comprises storing output of the analytics in local object storage accessible by the network management platform.

\* \* \* \* \*